United States Patent
Peeters et al.

(10) Patent No.: US 10,649,916 B2
(45) Date of Patent: May 12, 2020

(54) STORAGE IN A NON-VOLATILE MEMORY

(71) Applicants: STMicroelectronics (Rousset) SAS, Rousset (FR); Proton World International N.V., Diegem (BE)

(72) Inventors: Michael Peeters, Tourinnes-la-Grosse (BE); Fabrice Marinet, Chateauneuf le Rouge (FR); Jean-Louis Modave, Ottignies (BE)

(73) Assignees: STMicroelectronics (Rousset) SAS, Rousset (FR); Proton World International N.V., Diegem (BE)

( * ) Notice: Subject to any disclaimer, the term of this patent is extended or adjusted under 35 U.S.C. 154(b) by 230 days.

(21) Appl. No.: 15/486,947

(22) Filed: Apr. 13, 2017

(65) Prior Publication Data

US 2018/0137061 A1    May 17, 2018

(30) Foreign Application Priority Data

Nov. 16, 2016   (FR) ...................... 16 61108

(51) Int. Cl.
*G06F 21/60*   (2013.01)
*G06F 12/14*   (2006.01)
*G06F 21/72*   (2013.01)
*G06F 12/02*   (2006.01)
*G06F 21/79*   (2013.01)

(52) U.S. Cl.
CPC ...... *G06F 12/1408* (2013.01); *G06F 12/0246* (2013.01); *G06F 21/72* (2013.01); *G06F 21/79* (2013.01); *G06F 2212/1052* (2013.01); *G06F 2212/402* (2013.01); *H04L 2209/12* (2013.01)

(58) Field of Classification Search
CPC ........... G06F 12/14; G06F 12/02; G06F 21/72
See application file for complete search history.

(56) References Cited

U.S. PATENT DOCUMENTS

| | | | |
|---|---|---|---|
| 5,943,283 A * | 8/1999 | Wong | G06F 12/1408 365/221 |
| 2003/0141994 A1 | 7/2003 | Ishioka et al. | |
| 2012/0297111 A1 * | 11/2012 | Hsu | G11C 16/3427 711/103 |
| 2015/0019878 A1 | 1/2015 | Gammel | |
| 2017/0093823 A1 * | 3/2017 | Gopal | H04L 63/061 |

FOREIGN PATENT DOCUMENTS

| | | | | |
|---|---|---|---|---|
| GB | 2 424 089 A | | 9/2006 | |
| GB | 2424089 A | * | 9/2006 | ......... G06F 12/1408 |

* cited by examiner

*Primary Examiner* — Wasika Nipa
(74) *Attorney, Agent, or Firm* — Seed IP Law Group LLP

(57) ABSTRACT

A non-volatile memory is organized in pages and has a word writing granularity of one or more bytes and a block erasing granularity of one or more pages. Logical addresses are scrambling into physical addresses used to perform operations in the non-volatile memory. The scrambling includes scrambling logical data addresses based on a page structure of the non-volatile memory and scrambling logical code addresses based on a word structure of the non-volatile memory.

19 Claims, 4 Drawing Sheets

STORAGE IN A NON-VOLATILE MEMORY

BACKGROUND

Technical Field

The present description relates, in a general manner, to electronic circuits and, more particularly, to circuits using a non-volatile memory. The present description is, for example, aimed at the management of the storage of information (data and programs) in a non-volatile memory, such as in a flash memory.

Description of the Related Art

Integrated circuits may comprise circuits or information (referred to as secret information) which are considered as sensitive in view of the security of the data that they are processing, such as authentication keys, signatures, etc., or algorithms that they are using, such as encryption or decryption algorithms. Generally, such information must not be communicated nor be detectable by third parties or by unauthorized circuits. In particular, it sometimes must be ensured that the location of this information within a non-volatile memory must not be detected.

The techniques for analysis of the operation of an integrated circuit are becoming more and more powerful and hackers benefit from analysis techniques that are increasingly sophisticated. In particular, attacks via hidden channels (analysis of the power consumption of the circuit, of its electromagnetic radiation, etc.) are increasingly sophisticated.

BRIEF SUMMARY

Flash memories may exhibit particular constraints in terms of differences in write, read and erase granularity.

An embodiment provides a method for scrambling addresses in a non-volatile memory, organized in pages, in which:
the memory exhibits a word writing granularity comprising one or more bytes;
the memory comprises a block erasing granularity comprising one or more pages of several words each; and
logical addresses are converted into physical addresses while complying with the following conditions:
the data addresses are scrambled while complying with the structure of the pages;
the code addresses are scrambled while complying with the structure of the words.

According to one embodiment, the code and data addresses are furthermore scrambled while complying with the structure of the blocks.

According to one embodiment, address scrambling functions involve words representative of keys, identical or different, for all the functions.

According to one embodiment, the scrambling of the addresses modifies the most significant bits representative of the address without modifying the bits representative of the address of the word within the page.

According to one embodiment, a function for scrambling the data addresses modifies the least significant bits representative of the address without modifying the bits representative of the page address.

According to one embodiment, the blocks are assembled into groups of blocks.

According to one embodiment, a function for scrambling the code addresses modifies the least significant bits representative of the address without modifying the address of the bits representative of the address of the group of blocks.

An embodiment provides an electronic circuit, comprising:
a processing unit;
at least one non-volatile memory; and
a address scrambling circuit between the processing unit and the non-volatile memory, designed to implement one or more of the methods described.

In an embodiment, a method comprises: scrambling, using scrambling circuitry of a non-volatile memory organized in pages and having a word writing granularity of one or more bytes and a block erasing granularity of one or more pages, logical addresses into physical addresses, by: scrambling logical data addresses based on a page structure of the non-volatile memory; and scrambling logical code addresses based on a word structure of the non-volatile memory; and performing memory operations based on the physical addresses. In an embodiment, the method comprises scrambling the logical addresses based on a block structure of the non-volatile memory. In an embodiment, the scrambling is based on one or more keys associated with one or more of the word structure, the page structure and the block structure of the non-volatile memory. In an embodiment, the scrambling includes modifying a set of most significant bits representative of an address without modifying bits representative of a word within a page. In an embodiment, scrambling a data address includes modifying a set of least significant bits representative of the data address without modifying bits representative of a page of the data address. In an embodiment, the blocks are organized into groups of blocks. In an embodiment, scrambling a code address includes modifying a set of least significant bits representative of the code address without modifying bits representative of an address of a group of blocks.

In an embodiment, a circuit comprises: at least one non-volatile memory organized in pages and having a word writing granularity of one or more bytes and a block erasing granularity of one or more pages; and scrambling circuitry coupled to the non-volatile memory and which, in operation, converts logical addresses into physical addresses, by: scrambling logical data addresses based on a page structure of the non-volatile memory; and scrambling logical code addresses based on a word structure of the non-volatile memory. In an embodiment, the scrambling circuitry, in operation, scrambles the logical addresses based on a block structure of the non-volatile memory. In an embodiment, the scrambling circuitry, in operation, scrambles addresses based on one or more keys associated with one or more of the word structure, the page structure and the block structure of the non-volatile memory. In an embodiment, the scrambling circuitry, in operation, scrambles addresses by modifying a set of most significant bits representative of an address without modifying bits representative of a word within a page. In an embodiment, the scrambling circuitry, in operation, scrambles a data address by modifying a set of least significant bits representative of the data address without modifying bits representative of a page of the data address. In an embodiment, blocks of the non-volatile memory are organized into groups of blocks. In an embodiment, the scrambling circuitry, in operation, scrambles a code address by modifying a set of least significant bits representative of the code address without modifying bits representative of an address of a group of blocks.

In an embodiment, a non-transitory, computer-readable medium's contents cause a scrambling circuit of a non-volatile memory to scramble logical addresses into physical addresses, the non-volatile memory being organized in pages and having a word writing granularity of one or more bytes and a block erasing granularity of one or more pages, the scrambling comprising: scrambling logical data addresses based on a page structure of the non-volatile memory; and scrambling logical code addresses based on a word structure of the non-volatile memory, wherein operations in the non-volatile memory are performed using the physical addresses. In an embodiment, the scrambling comprises scrambling the logical addresses based on a block structure of the non-volatile memory. In an embodiment, the scrambling is based on one or more keys associated with one or more of the word structure, the page structure and the block structure of the non-volatile memory. In an embodiment, the scrambling circuit comprises a processor and the contents include instructions executed by the processor.

In an embodiment, a system comprises: data processing circuitry; a non-volatile memory organized in pages and having a word writing granularity of one or more bytes and a block erasing granularity of one or more pages; and scrambling circuitry, coupled between the data processing circuitry and a decoder of the non-volatile memory, wherein the scrambling circuitry, in operation, converts logical addresses into physical addresses, by: scrambling logical data addresses based on a page structure of the non-volatile memory; and scrambling logical code addresses based on a word structure of the non-volatile memory. In an embodiment, the scrambling circuitry, in operation, scrambles the logical addresses based on a block structure of the non-volatile memory. In an embodiment, the scrambling circuitry, in operation, scrambles addresses by modifying a set of most significant bits representative of an address without modifying bits representative of a word within a page. In an embodiment, the system comprises an integrated circuit including at least the non-volatile memory and the scrambling circuitry.

BRIEF DESCRIPTION OF THE SEVERAL VIEWS OF THE DRAWINGS

Example features and advantages of various embodiments, together with others, will be presented in detail in the following description of particular embodiments given by way of non-limiting examples in relation with the appended figures amongst which.

DETAILED DESCRIPTION

Similar elements have been identified by the same references in the various figures, unless the context indicates otherwise.

For the sake of clarity, only the steps and elements useful to the understanding of the embodiments that will be described have been shown and will be detailed.

Figure 1:
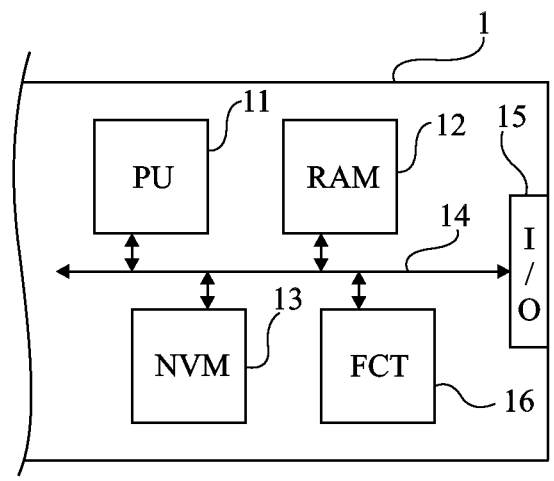
FIG. 1 shows, very schematically and in the form of blocks, one embodiment of an electronic circuit of the type to which, by way of example, the embodiments described apply.

FIG. 1 shows, very schematically and in the form of blocks, one embodiment of an electronic circuit 1 of the type to which, by way of example, the embodiments that will be described apply.

The circuit 1 comprises:
- one or more processing units 11 or circuits (PU), for example a state machine, a microprocessor, a programmable logic circuit, etc.;
- one or more volatile storage areas 12 (RAM), for example of the RAM memory type or registers, which temporarily stores information (instructions, addresses, data) during the processing operations;
- one or more non-volatile storage areas 13 (NVM) (for example of the flash type) which stores information in a generally permanent manner and, in particular, when the circuit is not powered;
- one or more buses 14, which transmits data, addresses and/or commands between the various elements internal to the circuit 1; and
- one or more input-output interfaces 15 (I/O), for example of the serial bus type, which receives or transmits communications with the outside of the circuit 1. The circuit 1 may incorporate a contactless communications circuit (CLF—ContactLess Front-end), of the NFC (Near Field Communication) communications type.

Furthermore, the circuit 1 may incorporate other circuits depending on the application, for example, a crypto-processor, other interfaces, other memories, etc., symbolized by a block 16 (FCT) in FIG. 1.

The circuit 1, or a part of the latter including at least one non-volatile memory, volatile memory elements and an execution unit are considered as secure, in other words the execution unit can extract and store information from/in the memory or memories in a secure manner and handle this information also in a secure manner.

On the other hand, the circuit should facilitate preventing the information stored in the non-volatile memory from being exploited.

An embodiment includes the organization of the storage of the information in the non-volatile memory in a particular manner in order to facilitate preventing the accesses to the memory from being detectable to attacks via hidden channels. An embodiment facilitates preventing a reading of this information which is usable by an unauthorized circuit or unit.

In the following, examples more particularly applicable to a flash memory will be described. However, embodiments are more generally applicable to any non-volatile memory.

The storage in a non-volatile memory makes use of an interface or address decoder which converts logical addresses into physical addresses. Simply stated, the logical addresses correspond to the addresses used by the processing unit and the physical addresses localize the physical location of the information in the memory.

According to the embodiments described, the data and the code in the memory are scrambled in a particular manner so as to render unusable information read in the memory by a circuit or a unit not possessing the organizational rules for the storage.

Figure 2:
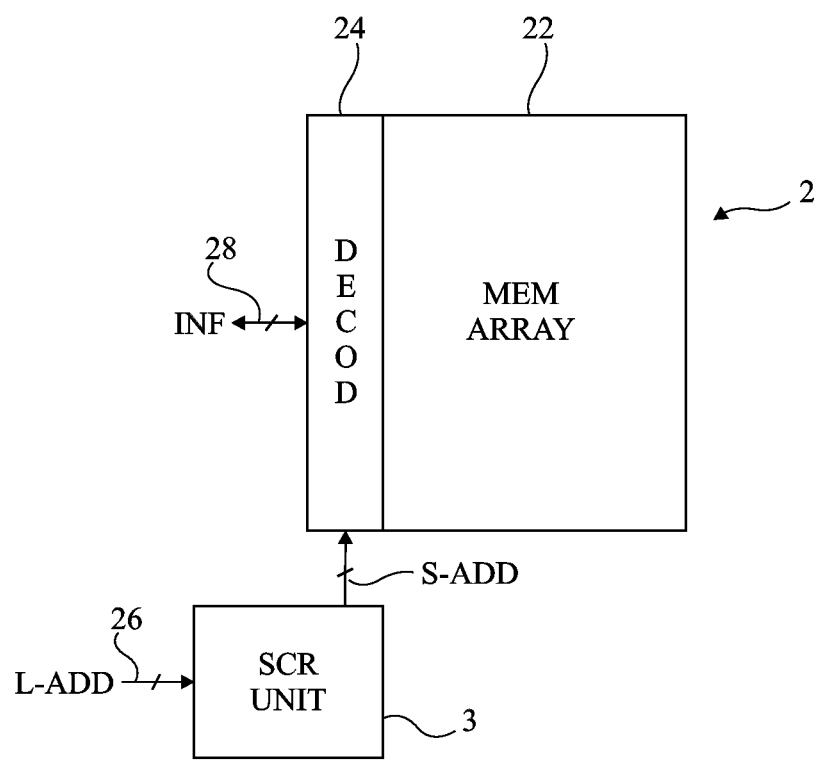
FIG. 2 shows, very schematically and in the form of blocks, one embodiment of a memory circuit equipped with an address scrambling circuit.

FIG. 2 shows, very schematically and in the form of blocks, one embodiment of a memory circuit 2 equipped with an address scrambling circuit.

The memory 2 comprises a memory plane 22 (MEM ARRAY) formed of a matrix array of memory cells and an address decoder 24 (DECOD) responsible for decoding logical addresses L-ADD received from an address bus 26 into physical addresses in order to orient information INF received on a bus 28 (write) or to supply information INF read on this bus 28 (read). The bus 28 is usually denoted "data bus", this data representing the content stored in the memory. However, in the embodiments described differentiating, from amongst these stored data values, the code or instructions (the program or programs and algorithms to be executed) and the data as such or variables, the bus 28 is arbitrarily denoted "information bus" in order to distinguish it from the address bus.

In the embodiment shown in FIG. 2, an address scrambling circuit 3 (SCR UNIT) intercepts the logical addresses L-ADD in order to scramble them prior to supplying scrambled addresses S-ADD to the address decoder 24 which converts these scrambled addresses S-ADD into physical addresses. Thus, the decoder 24 does not directly convert the logical addresses L-ADD but scrambled or mixed up (logical) addresses. Consequently, reading information in the memory based on logical addresses L-ADD directly decoded by the decoder 24, without applying the scrambling law of the unit 3, provides unusable information since it does not correspond to the expected information.

Figure 3:
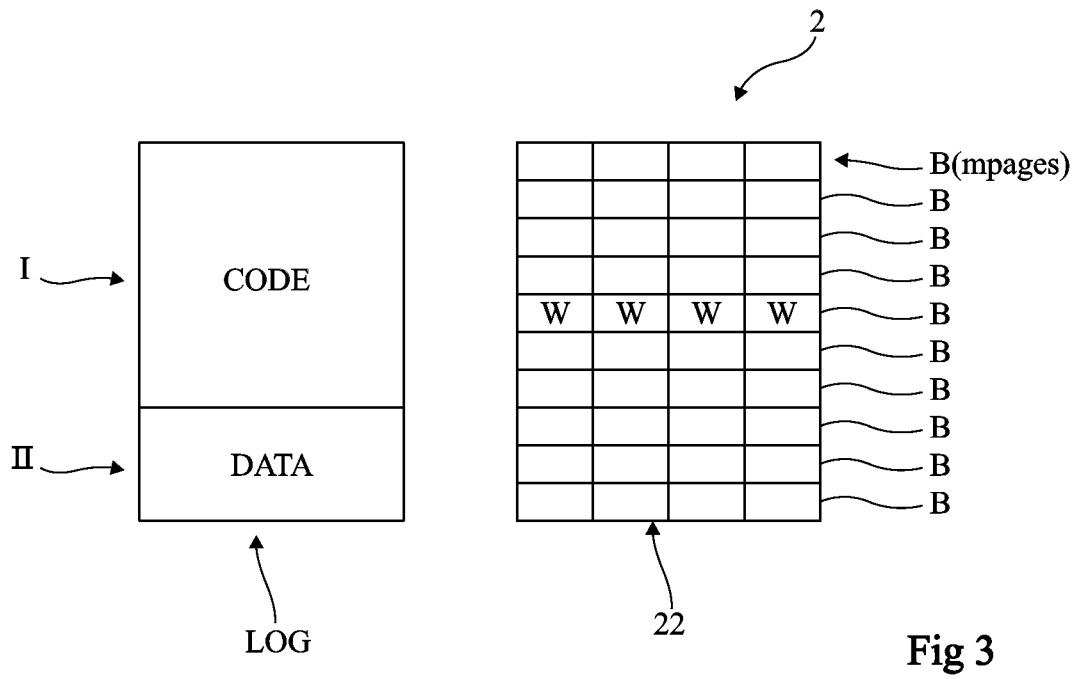
FIG. 3 illustrates, very schematically, the organization of the memory in terms of logical space and of physical space.

FIG. 3 illustrates, very schematically, the organization of the memory 2 in terms of logical space and of physical space.

The logical memory LOG, in other words the logical memory space in terms of addresses, is divided into two regions I and II, of identical or different sizes, intended to respectively contain code or instructions CODE (the program or programs and algorithms to be executed) and data as such DATA. The data are assumed to vary over time, in other words to change value, whereas the code is generally fixed, with the exception of updates of the code itself. The data corresponds for example to variables, values, address values, operands, etc.

According to one embodiment, the physical memory or memory plane 22 (its physical addressing) is divided up into several blocks B of one or more pages, each page being divided up into words W of one or more bytes. The word corresponds to the granularity of physical addressing for writing or reading information (data or code) in the memory. The block B corresponds to the granularity of physical addressing for erasing information in the memory. In practice, for a flash memory, the read and write granularity is the byte and the erase granularity is the page. However, in order to optimize the addressing, several bytes (one word) for the write or the read and several pages (one block) for the erase may be assembled at the physical addressing level.

In an embodiment, the code addresses and the data addresses are scrambled in a different fashion. Here, advantage is taken of the fact that the code is fixed, which means that it only needs to be accessed for reading, whereas the data values are variable and must therefore be writable and also erasable. Thus, the addresses will be scrambled with a granularity at the word level for the code and at the block level (or as a variant at the page level) for the data. All the code and data addresses are furthermore scrambled while complying with the block structure.

Figure 4:
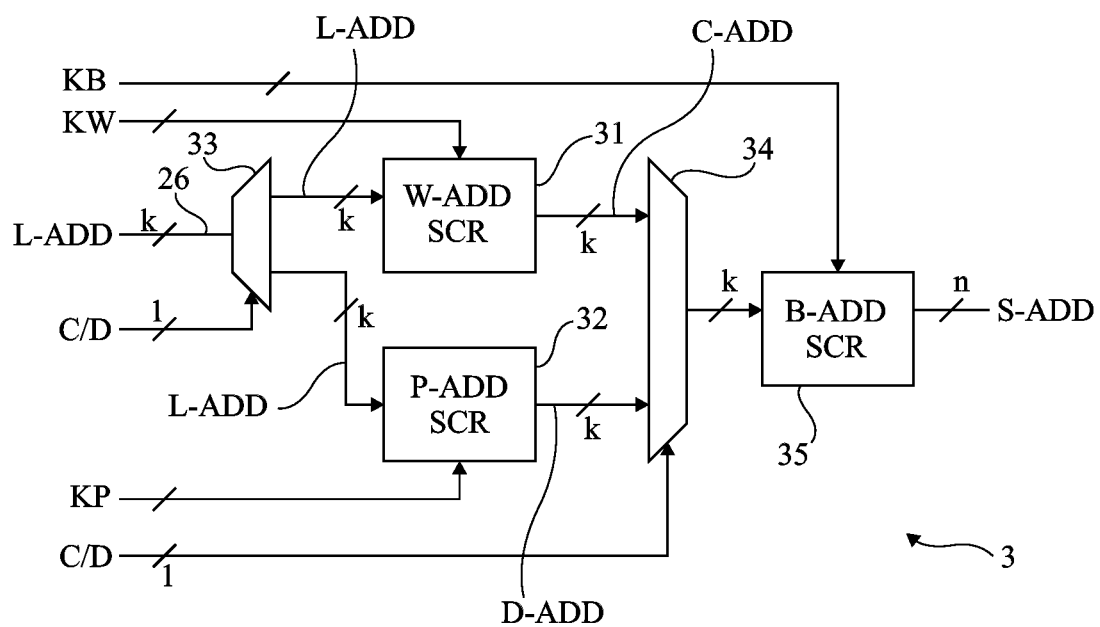
FIG. 4 shows, very schematically and in the form of blocks, one embodiment of an address scrambling circuit.

FIG. 4 shows, very schematically and in the form of blocks, one embodiment of the address scrambling circuit 3.

According to this embodiment, the circuit 3 comprises two circuits or functions 31 and 32 which scramble addresses respectively receiving the logical code addresses and the logical data addresses without changing the region addresses (I or II). Functionally, the address bus 26 receiving the logical addresses L-ADD (for example from the processing unit 11) can be sent over a multiplexer 33, one into two, responsible for routing the addresses towards one or the other circuits 31 and 32. The circuit 31 (W-ADD SCR) scrambles the addresses while complying with the structure of the words W, defining the smallest granularity between reading and writing in the memory. The circuit 32 (P-ADD SCR) scrambles the addresses while complying with the structure of the pages P (as a variant, of the blocks) defining the granularity of erasing in the memory. The multiplexer 33 is controlled by a signal C/D on a bit identifying the logical region I or II, hence whether it is a data or code bit. As a variant, the multiplexer 33 is omitted and the address bus 26 is directly connected to the address inputs of the units 31 and 32.

In the embodiment shown, the blocks are also mixed, in other words the positions of the blocks are mixed independently of the fact that they contain data or code. Functionally, a multiplexer 34, two into one, receives the addresses scrambled by the units 31 and 32 and sends them to a unit 35 (B-ADD SCR) for scrambling the addresses at the block level, in other words mixing the position of the blocks within the storage space. The unit 35 supplies the scrambled address S-ADD to the decoder 24 (FIG. 2). The multiplexer 34 is controlled by the signal C/D.

In one simplified embodiment, the scrambled addresses, supplied by the multiplexer 34, are supplied to the address decoder 24, in other words the blocks of data remain in the same order and only the order of the pages within each block is modified, whereas the positions of the code words are mixed inside of each block.

Assuming that the logical addresses are increasing within the logical space, the signal C/D may for example come from a comparison of the logical address L-ADD with respect to a threshold representing the first address of the region II.

The processing operations carried out comply with the size of the addresses, for example k bits.

The scrambling law implemented by each unit 31, 32 or 35 may be identical or different for each unit. The scrambling laws may be defined, in other words fixed, or may depend on scrambling keys, KW, KP or KB, respectively, identical to or different from one another. The use of scrambling keys for example allows the scrambling to be individualized from one circuit to another.

FIGS. 5 to 8 show exemplary embodiments of the functions 31, 32 and 35 for scrambling addresses.

It is arbitrarily assumed that the first three address bits (the least significant bits—lsb) identify the bytes in one word. For example, by considering code or instruction words of 64 bits, i.e., 8 bytes, the three least significant bits of the address identify the byte in the word and the k−3 remaining address bits therefore identify the word.

It is also assumed that all the scrambling functions use the same key "key" representing the keys KB, KW and KP.

Figure 5:
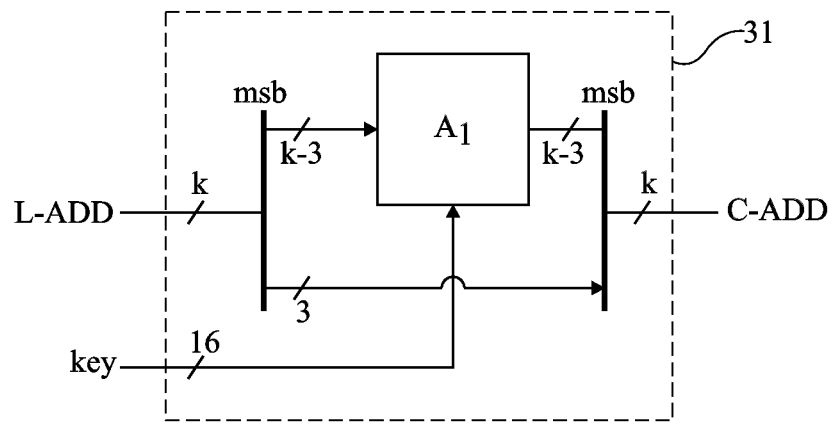
FIG. 5 shows one exemplary embodiment of the function for scrambling code addresses.

FIG. 5 shows one exemplary embodiment of the function 31 for scrambling code addresses.

The k−3 most significant bits msb of the address L-ADD are sent to a block scrambling function A1, whereas the 3 least significant bits pass through the unit 31 without being modified. The function A1 receives the key "key", for example over 16 bits, in order to scramble the k−3 most significant bits. Thus, the words of the code having successive addresses in the logical memory are scrambled (divided up) into several memory pages, and in an embodiment, sent into different blocks. The scrambling is applicable to the k−3 most significant bits, which therefore means a scrambling of words of 2^3=8 bytes (64 bits). The scrambling complies with the structure of the words, which is the smallest read unit for the memory.

According to one variant embodiment, a protection is also desired against unauthorized reading by an external circuit, so the bytes within each word will also be mixed up. For this purpose, a block receiving the three least significant bits at the input and supplying three scrambled bits at the output is added. The key "key" and the k−3 most significant address bits may, for example, be used as scrambling key for the bytes. Thus, the k−3 address bits are also scrambled, the most significant bit representing the word W.

Figure 6:
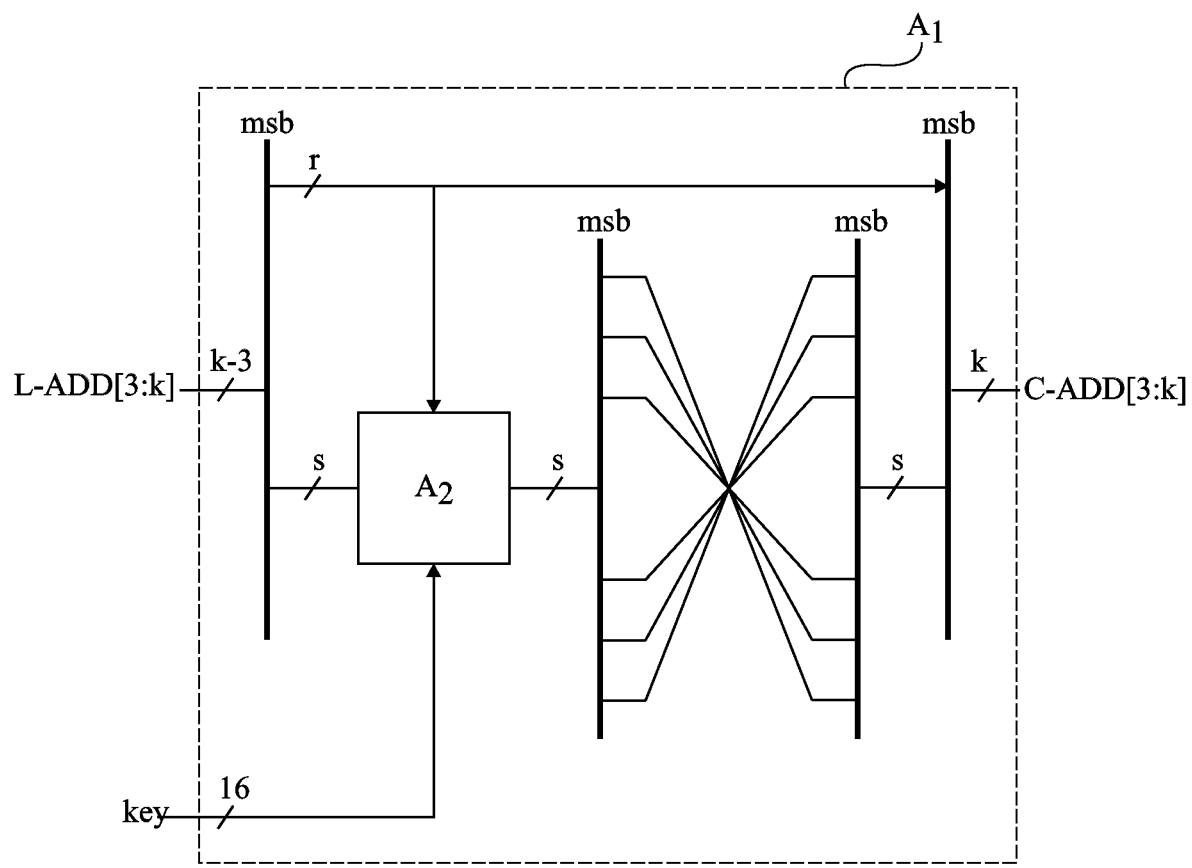
FIG. 6 shows one exemplary embodiment of a function in FIG. 5 for processing code addresses.

FIG. 6 shows one exemplary embodiment of the function A1 in FIG. 5 for processing the k−3 bits (L-ADD[3:k]) of the address L-ADD.

It is assumed that groups of blocks, or macro-blocks, are taken into account. For example, in a memory with 2^k bytes, there are 2^r groups of size 2^s bytes each. In k bits, the r most significant bits identify the group and the s following bits (included between k−r and k−r−3) identify the byte in the region.

It is noted that the size of the memory is not necessarily a power of two. For example, there can be R<=2^r groups of 2^s bytes each. In this case, a permutation over a set of integers (the addresses) is constructed with a size not necessarily equal to a power of 2, in other words, a function y=f(x) with x and y taken from within the set of values within [0; R*2^s−1]. It is however easier to construct a scrambling such as shown in FIG. 6 which conserves the structure in groups of blocks. The block 35 in FIG. 4 is responsible for extending the scrambling over all the groups, while complying with the block structure.

The larger the groups the better the scrambling, but this reduces the granularity of the memory areas that may be provided. For example, for groups of 64 kilo-bytes (s=16), assuming that the application needs 130 kilo-bytes, a granularity of 192 kilo-bytes needs to be provided.

In the example in FIG. 6, the value r, representative of the number of groups, is used as a diversification value. These r bits are not modified by the function A1. The s (or k−3−r) remaining bits are combined, for example by a function A2 of the EXCLUSIVE OR type, with the key "key" and the r bits, the key and the r bits being concatenated. The function A2 is one particularly simple example but any other random permutation may be provided.

A second optional step of the function A1 comprises permutating one-to-one the most significant bits with the least significant bits. The bit of rank k−3−r becomes the bit of rank 4, the bit of rank k−r−1 becomes the bit of rank 5, etc., up to the bit of rank 4 which becomes the bit of rank k−3−r. This second step improves the robustness of the scrambling operated by the function A2 so as to increase the chances of two consecutive code words being in different blocks.

Figure 7:
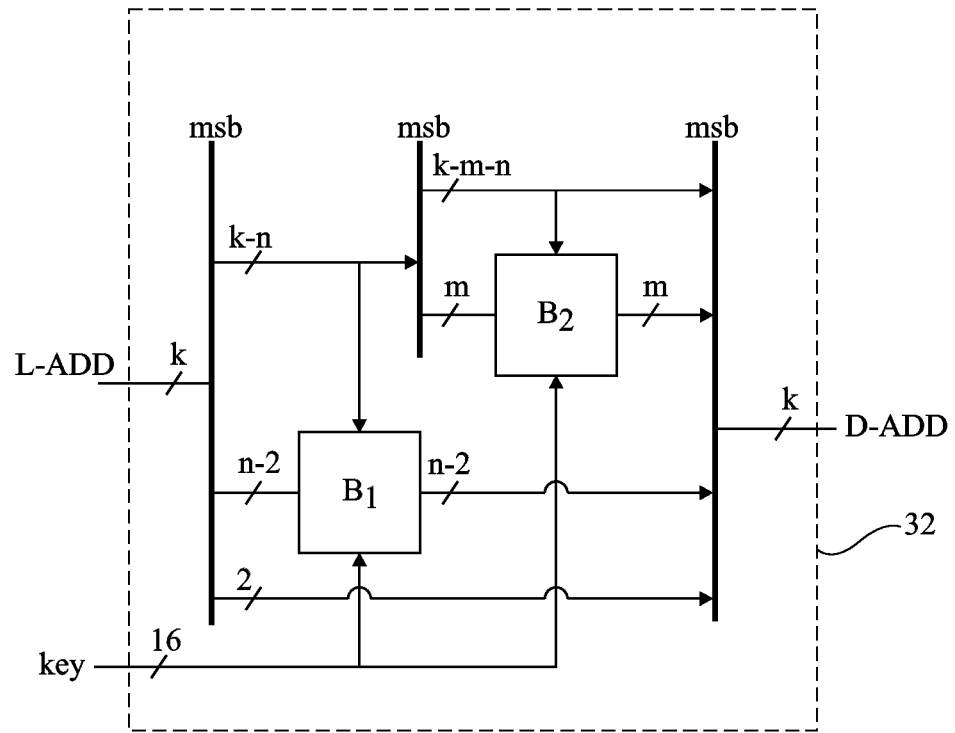
FIG. 7 shows one exemplary embodiment of a function for scrambling data addresses.

FIG. 7 shows one exemplary embodiment of the circuit 32 which scrambles data addresses.

Here, it is desired to comply not only with the block structure but also the page structure in order to be compatible with an erasing by page. Indeed, the same function as for the code could have been applied but the problem would then be posed that, during a page erase operation, it would in fact be necessary to temporarily save the whole region II and to erase all the pages of this region, which is in practice unrealistic.

In the embodiments shown, pages of 2^n bytes and blocks of 2^m pages are assumed. The size of the memory is then R*2^s bytes (with R<=2^r), and there are therefore R*2^(s−m−n) blocks in memory. According to one particular exemplary embodiment, n=9, m=2, s=15, k=18, and hence r=3.

It is arbitrarily assumed that the code words and the data words do not have the same size and that, for example, the data words are over 32 bits, whereas the code words are over 64 bits.

According to this example illustrated in FIG. 7, it is considered that the two least significant bits represent the address of one byte within a data word. As a result, these bits pass through the function 32 without being modified.

Amongst the k−2 remaining bits, the n−2 least significant bits representing the address of the word within the page are subjected to a function B1. This function B1 is, according to one simplified embodiment, a function of the EXCLUSIVE OR type with the k−n most significant bits and the key "key".

Amongst the k−n most significant bits of the addresses L-ADD, the k−m−n bits are for example left unchanged and the m remaining bits are subjected to a function B2, for example a function of the EXCLUSIVE OR type with the m most significant bits and the key "key".

The example in FIG. 7 complies with the data-word structure (two bytes within the same logical word will remain within the same physical word), the page structure (two words within the same logical page remain within the same physical page) and the block structure. FIG. 7 does not scramble the blocks, in other words the k−m−n most significant bits are not scrambled.

Figure 8:
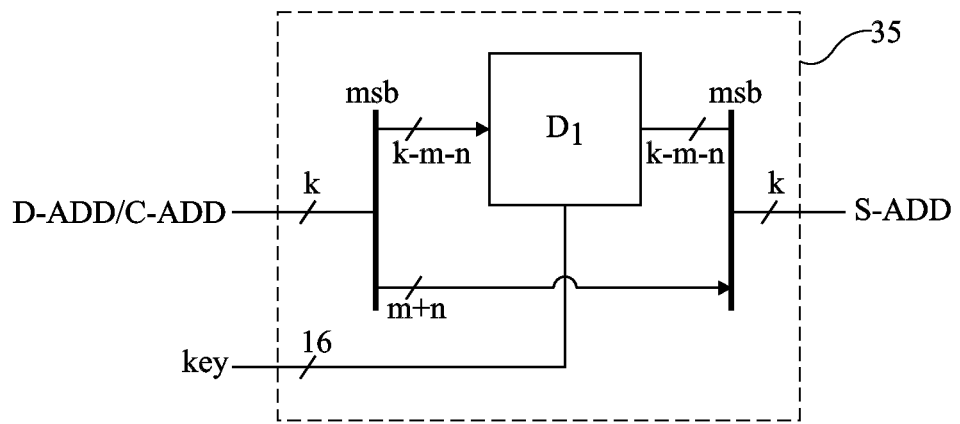
FIG. 8 shows one exemplary embodiment of an address scrambling function.

FIG. 8 shows one exemplary embodiment of the circuit 35 which scrambles (for permutation) of the blocks.

The addresses C-ADD and D-ADD coming from the circuits 31 and 32 are subjected to a scrambling while complying with the structure of the blocks. Thus, the m+n least significant bits of the k address bits are not modified, whereas the k−m−n most significant bits are subjected to a function Dl.

One advantage of the embodiments which have been described is that they allow the addresses to be scrambled in a manner that is transparent both for the processing unit and for the address decoder of the memory.

Various embodiments have been described. It will be noted that these various embodiments and their variants may be combined. Other variants and modifications will be apparent to those skilled in the art. The practical implementation of the embodiments that have been described is available to those skilled in the art based on the functional indications given hereinabove. In particular, although the description uses a vocabulary corresponding to a hardware implementation, a software implementation is possible.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
scrambling, using scrambling circuitry of a non-volatile memory organized in pages and having a word writing granularity of one or more bytes and a block erasing granularity of one or more pages, logical addresses into physical addresses, by:
scrambling logical data addresses based on a page structure of the non-volatile memory, wherein scrambling a data address includes modifying a set of least significant bits representative of the data address without modifying bits representative of a page of the data address; and
scrambling logical code addresses based on a word structure of the non-volatile memory, wherein the scrambling of logical data addresses is different from the scrambling of logical code addresses, the blocks are organized into groups of blocks and scrambling a code address includes modifying a set of least significant bits representative of the code address without modifying bits representative of an address of a group of blocks; and
performing memory operations based on the physical addresses.

2. The method according to claim 1 comprising scrambling the logical addresses based on a block structure of the non-volatile memory.

3. The method according to claim 1 wherein the scrambling is based on one or more keys associated with one or more of the word structure, the page structure and the block structure of the non-volatile memory.

4. The method according to claim 1 wherein the scrambling includes modifying a set of most significant bits representative of an address without modifying bits representative of a word within a page.

5. A circuit, comprising:
at least one non-volatile memory organized in pages and having a word writing granularity of one or more bytes and a block erasing granularity of one or more pages; and
scrambling circuitry coupled to the non-volatile memory and which, in operation, converts logical addresses into physical addresses, by:
scrambling logical data addresses based on a page structure of the non-volatile memory, wherein scrambling a data address includes modifying a set of least significant bits representative of the data address without modifying bits representative of a page of the data address; and
scrambling logical code addresses based on a word structure of the non-volatile memory, wherein the scrambling of logical data addresses is different from the scrambling of logical code addresses, the blocks are organized into groups of blocks and scrambling a code address includes modifying a set of least significant bits representative of the code address without modifying bits representative of an address of a group of blocks.

6. The circuit of claim 5 wherein the scrambling circuitry, in operation, scrambles the logical addresses based on a block structure of the non-volatile memory.

7. The circuit of claim 5 wherein the scrambling circuitry, in operation, scrambles addresses based on one or more keys associated with one or more of the word structure, the page structure and the block structure of the non-volatile memory.

8. The circuit of claim 5 wherein the scrambling circuitry, in operation, scrambles addresses by modifying a set of most significant bits representative of an address without modifying bits representative of a word within a page.

9. A non-transitory, computer-readable medium having contents which cause a scrambling circuit of a non-volatile memory to scramble logical addresses into physical addresses, the non-volatile memory being organized in pages and having a word writing granularity of one or more bytes and a block erasing granularity of one or more pages, the scrambling comprising:
scrambling logical data addresses based on a page structure of the non-volatile memory, wherein scrambling a data address includes modifying a set of least significant bits representative of the data address without modifying bits representative of a page of the data address; and
scrambling logical code addresses based on a word structure of the non-volatile memory, wherein operations in the non-volatile memory are performed using the physical addresses, the scrambling of logical data addresses is different from the scrambling of logical code addresses, the blocks are organized into groups of blocks and scrambling a code address includes modifying a set of least significant bits representative of the code address without modifying bits representative of an address of a group of blocks.

10. The non-transitory, computer-readable medium of claim 9 wherein the scrambling comprises scrambling the logical addresses based on a block structure of the non-volatile memory.

11. The non-transitory, computer-readable medium of claim 9 wherein the scrambling is based on one or more keys associated with one or more of the word structure, the page structure and the block structure of the non-volatile memory.

12. The non-transitory, computer-readable medium of claim 9 wherein the scrambling circuit comprises a processor and the contents include instructions executed by the processor.

13. A system, comprising:
data processing circuitry;
a non-volatile memory organized in pages and having a word writing granularity of one or more bytes and a block erasing granularity of one or more pages; and
scrambling circuitry, coupled between the data processing circuitry and a decoder of the non-volatile memory, wherein the scrambling circuitry, in operation, converts logical addresses into physical addresses, by:

scrambling logical data addresses based on a page structure of the non-volatile memory, wherein scrambling a data address includes modifying a set of least significant bits representative of the data address without modifying bits representative of a page of the data address; and scrambling logical code addresses based on a word structure of the non-volatile memory, wherein the scrambling of logical data addresses is different from the scrambling of logical code addresses, the blocks are organized into groups of blocks and scrambling a code address includes modifying a set of least significant bits representative of the code address without modifying bits representative of an address of a group of blocks.

14. The system of claim 13 wherein the scrambling circuitry, in operation, scrambles the logical addresses based on a block structure of the non-volatile memory.

15. The system of claim 13 wherein the scrambling circuitry, in operation, scrambles addresses by modifying a set of most significant bits representative of an address without modifying bits representative of a word within a page.

16. The system of claim 13 wherein the system comprises an integrated circuit including at least the non-volatile memory and the scrambling circuitry.

17. The system of claim 13, wherein the scrambling circuitry, in operation:
   responds to a read request from the data processing circuitry directed to a logical data address by scrambling the logical data address in a first manner and providing the scrambled logical data address to the decoder; and
   responds to a read request from the data processing circuitry directed to a logical code address by scrambling the logical code address in a second manner, different from the first manner, and providing the scrambled logical code address to the decoder.

18. The circuit of claim 5, wherein the scrambling circuitry, in operation:
   responds to a read request directed to a logical data address by scrambling the logical data address in a first manner; and
   responds to a read request directed to a logical code address by scrambling the logical code address in a second manner, different from the first manner.

19. The method of claim 1, comprising:
responding to a read request directed to a logical data address by scrambling the logical data address in a first manner; and
responding to a read request directed to a logical code address by scrambling the logical code address in a second manner, different from the first manner.

* * * * *